United States Patent [19]

Hotta et al.

[11] Patent Number: 4,501,686
[45] Date of Patent: Feb. 26, 1985

[54] ANION-DOPED POLYMERS OF FIVE-MEMBERED OXYGEN FAMILY HETEROCYCLIC COMPOUNDS AND METHOD FOR PRODUCING SAME

[75] Inventors: Shu Hotta, Hirakata; Tomiharu Hosaka, Yawata; Nobuo Sonoda, Settsu; Wataru Shimotsuma, Ibaraki, all of Japan

[73] Assignee: Matsushita Electric Industrial Co., Ltd., Japan

[21] Appl. No.: 488,598

[22] Filed: Apr. 25, 1983

[30] Foreign Application Priority Data

| Apr. 26, 1982 | [JP] | Japan | 57-70054 |
| May 13, 1982 | [JP] | Japan | 57-80895 |
| Jun. 17, 1982 | [JP] | Japan | 57-104924 |
| Sep. 2, 1982 | [JP] | Japan | 57-153009 |

[51] Int. Cl.$^3$ ............................. H01B 1/06
[52] U.S. Cl. ...................... 252/500; 252/518; 524/80; 524/401; 524/404; 524/411; 524/412; 524/415; 524/158; 528/487; 528/490; 528/491; 528/492
[58] Field of Search .............. 252/518, 500; 524/80, 524/401, 404, 408, 158, 409, 410, 411, 412, 414, 415; 528/487, 490, 491, 492

[56] References Cited

U.S. PATENT DOCUMENTS

| 4,344,869 | 8/1982 | Blinne et al. | 252/518 |
| 4,363,829 | 12/1982 | Seshimoto et al. | 252/500 |
| 4,374,048 | 2/1983 | Kim et al. | 252/518 |
| 4,407,739 | 10/1983 | Naarmann et al. | 252/518 |
| 4,411,826 | 10/1983 | Naarman et al. | 252/518 |

OTHER PUBLICATIONS

"Preparation of Thermostable and Electric-conducting Poly(2,5-Thienylene)" by T. Yamamoto et al, J. Polym. Sci. Polymer Lett. Ed., 18, 9 (1980).

"Organic Metals: Polypyrrole, a Stable Synthetic 'Metallic' Polymer by Keiji Kanazawa et al, J. Chem. Soc. Chem. Comm., 854 (1979).

"Conducting Polythiophene Films" by A. F. Diaz, IBM Technical Disclosure Bulletin, 23 (11), 5088 (1981).

*Primary Examiner*—Josephine L. Barr
*Attorney, Agent, or Firm*—Lowe, King, Price & Becker

[57] ABSTRACT

Polymeric materials consisting essentially of a polymer of recurring units of a five-membered oxygen family heterocyclic ring which are selected from furan, thiophene, selenophene, tellurophene and derivatives thereof. The polymer is doped with anions of the specific type. A method for producing the polymeric materials is also described which comprises electrochemically polymerizing a five-membered oxygen family heterocyclic compound in coexistence with an acceptor with or without use of a supporting electrolyte in such a way that anions of the specific type are taken in the polymerized heterocyclic compound. The polymeric material is obtained in the form of a dense tenacious film.

8 Claims, 6 Drawing Figures

CP/MAS spectrum of the polythienylene film containing perchlorate ions

ANION-DOPED POLYMERS OF FIVE-MEMBERED OXYGEN FAMILY HETEROCYCLIC COMPOUNDS AND METHOD FOR PRODUCING SAME

BACKGROUND OF THE INVENTION

1. Field of the Invention

This invention relates to novel semiconductive or conductive polymers and more particularly, to novel aniondoped polymers of five-membered oxygen family heterocyclic compounds and a method for producing the polymers of the just-mentioned type.

2. Description of the Prior Art

Several types of semiconductive or conductive polymers of five-membered heterocyclic compounds are known including, for example, poly(2,5-thienylene) and iodine-doped poly(2,5-thienylene) as described by T. Yamamoto et al, J. Polym. Sci., Polymer Lett. Ed., 18, 9 (1980). K. Keiji Kanazawa et al (J. Chem. Soc. Chem Comm., 854 (1979)) describe polymers obtained by electrolytic oxidation of pyrrole in the presence of supporting electrolytes such as tetraethylammonium fluoroborate. The polymers obtained from pyrrole have high conductivity and are useful as conductors. However, these polymers are porous and fragile and encounter difficulties in practical applications.

In IBM Technical Disclosure Bulletin, 23(11), 5088 (1981), A. F. Diaz, there are described polymers which are obtained by electrolytic oxidation of bithiophene. However, these polymers are much lower in conductivity than known pyrrole polymers, say, $10^{-6}$ to $10^{-1}$/ohm.cm.

Thus, the prior art fails to provide conductive or semiconductive polymers which are tough or tenacious and can stand use without aid of any binders.

SUMMARY OF THE INVENTION

It is accordingly an object of the present invention to provide novel types of semiconductive or conductive polymers having recurring units of five-membered oxygen family heterocyclic rings which are dense and tenacious in nature.

It is another object of the invention to provide a method for producing novel types of semiconductive or conductive polymers which have recurring units of five-membered oxygen family heterocycles in the form of a dense, tenacious film or sheet.

According to one embodiment of the invention, there is provided a polymeric material which consists essentially of a polymer having recurring units of a five-membered oxygen family heterocyclic ring selected from the group consisting of unsubstituted or substituted furan, thiophene, selenophene and tellurophene rings, and anions doped in the polymer and selected from the group consisting of anions of tetrahalogenoborates, perhalogenates, hexahalogenoantimonates, sulfate, benzenesulfonate, TCNQ and its derivatives, and mixtures thereof, whereby the polymeric material is electrically conductive or semiconductive.

The anions in the polymer are not necessarily contained in stoichiometrical amounts. Because of the presence of anions in the polymeric material, the material exhibits a conductivity as high as about $10^{-1}$ to $10^2$/ohm.cm.

According to another embodiment of the invention, there is provided a method for producing the above-mentioned type of polymeric material which is characterized by electrochemically polymerizing a five-membered oxygen family heterocyclic compound in a liquid phase comprising an electron acceptor and a supporting electrolyte capable of releasing anions of a specific type. The polymerization reaction is usually effected under conditions of a current density ranging from 0.1 to 20 mA/cm$^2$ and a voltage of 1 to 100 V for a time sufficient for the polymerization. As a result, a dense tenacious film is formed on a positive electrode. In the above embodiment, a supporting electrolyte capable of releasing anions is used. If, however, an acceptor which also serves as a supporting electrolyte is used, it is not necessarily required to add supporting electrolytes to the reaction system.

DETAILED DESCRIPTION AND PREFERRED EMBODIMENTS OF THE INVENTION

Figure 1:
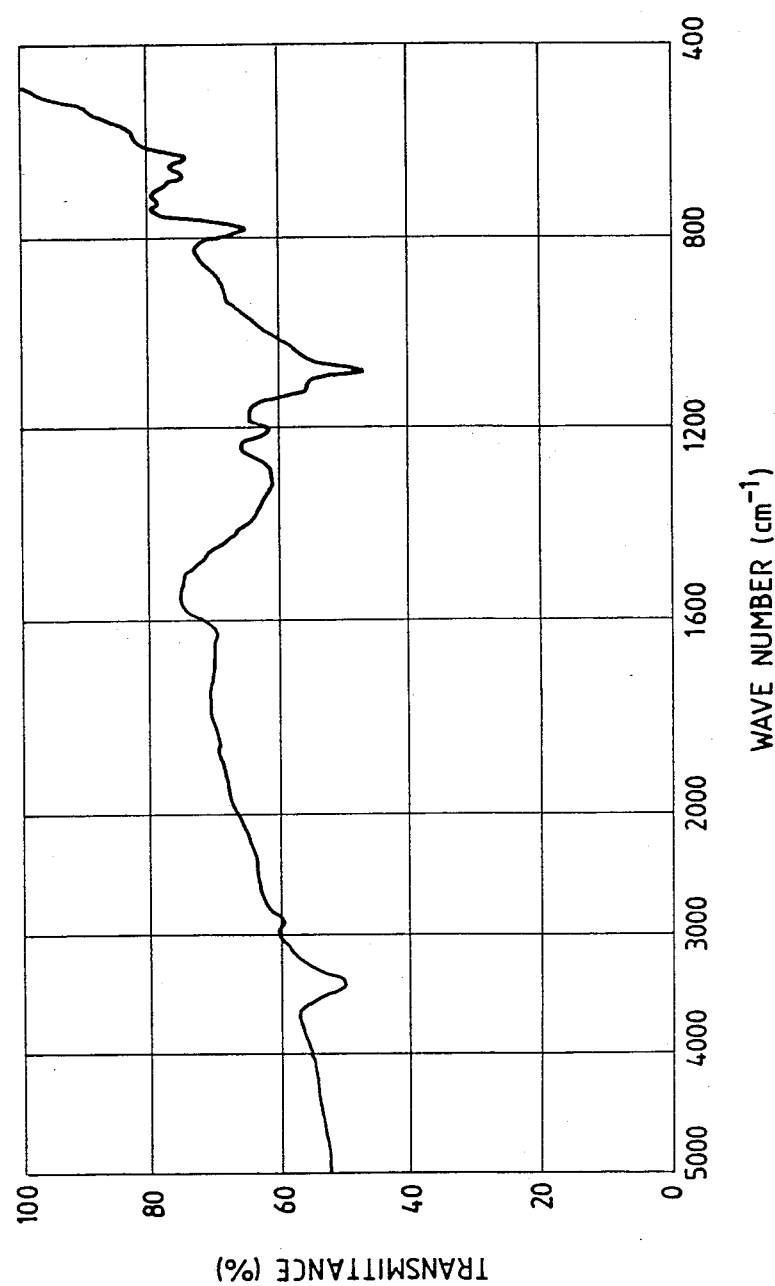
FIGS. 1 through 4 are infrared absorption spectra of polymeric materials of five-membered oxygen family heterocyclic compounds containing anions according to the invention, respectively.
Figure 2:
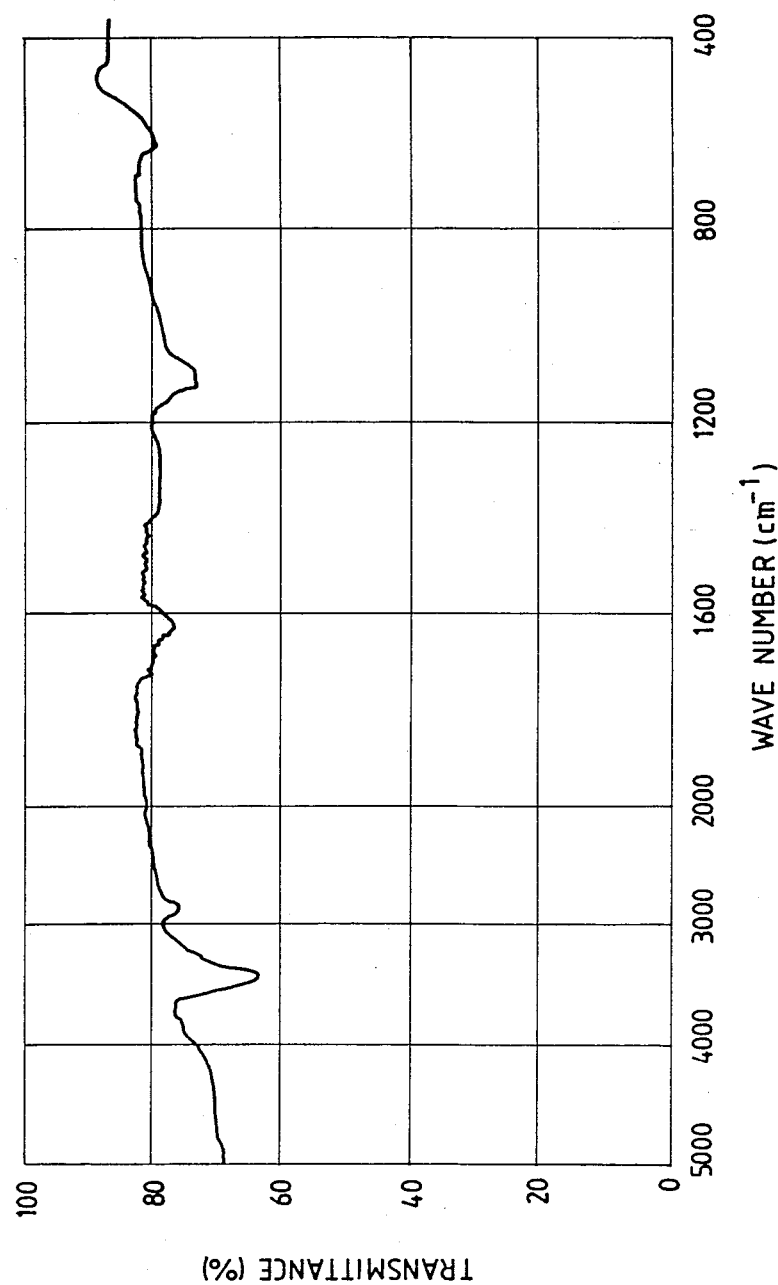
Figure 3:
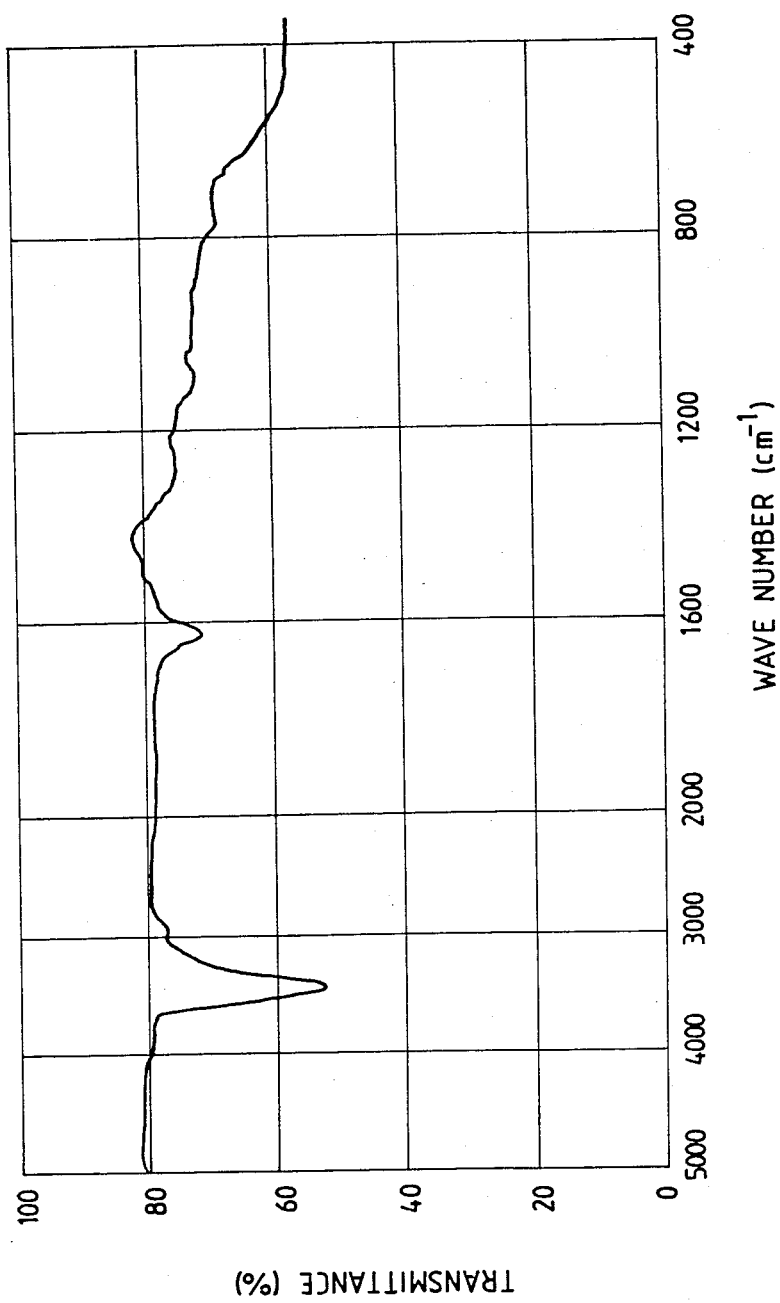
Figure 4:
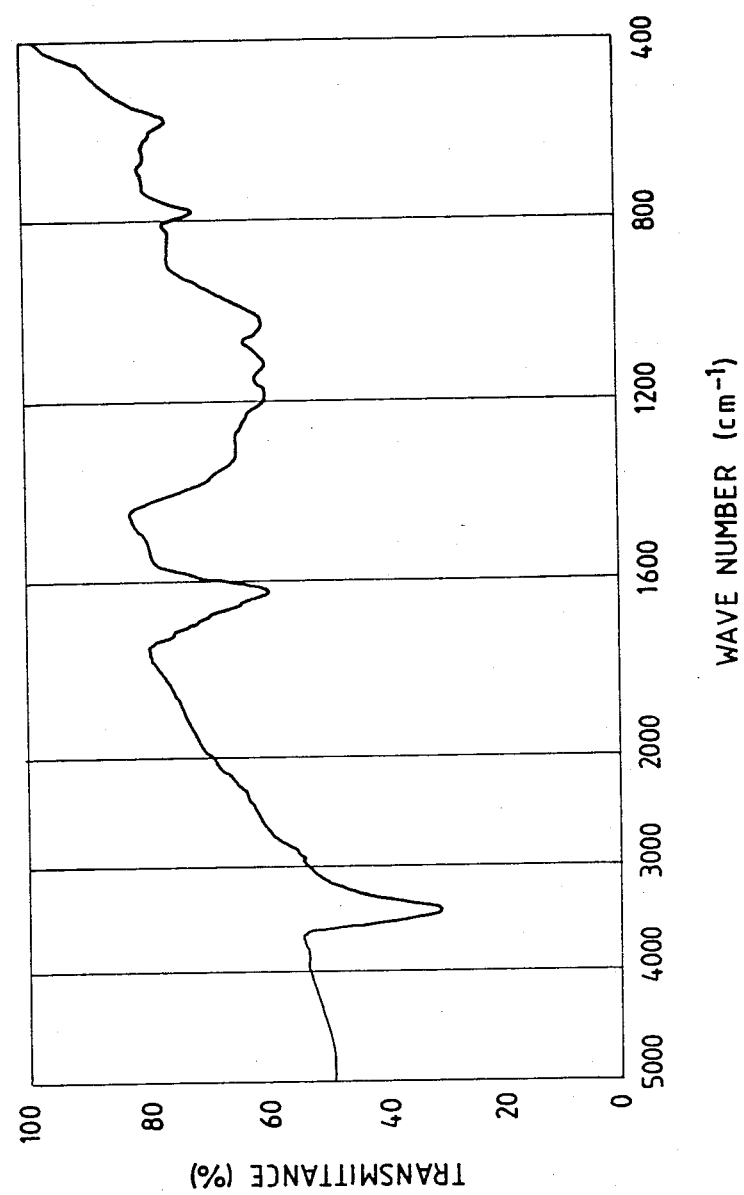

The polymeric materials according to the present invention comprise, as their skeletal structure, recurring units of a five-membered oxygen family heterocyclic ring. The five-membered oxygen family heterocyclic ring is a member selected from rings of furan, thiophene, selenophene and tellurophene. These rings may be unsubstituted or may have one or two substituents. The substituents include, for example, a halogen such as chlorine, bromine or iodine, a hydroxyl group, an amino group, and a hydrocarbon group having up to 8 carbon atoms. If the ring has two substituents, they may be the same or different. Of the four heterocyclic rings defined above, the thiophene, selenophene and tellurophene rings are superior in properties such as conductivity of the resulting polymeric materials. Presumably, this is because sulfur, selenium or tellurium has so large an atomic radius that outer shell electrons are freely movable in the polymer as free electrons. Among a variety of thiophene, selenophene and tellurophene compounds, methylthiophene is preferable because of the very high conductivity of the polymeric material obtained therefrom. That is, polymeric materials obtained from methylthiophene have a conductivity exceeding $10^2$/ohm.cm though the conductivity may more or less vary depending on the type of anion.

As a matter of course, the polymer may have recurring units of two or more different types of rings defined above.

The anions incorporated in and chemically combined with the polymer of the five-membered oxygen family heterocyclic compound are those of tetrahalogenoborates of the formulas, BX$_4$, in which X represents herein and hereinafter a halogen such as fluorine, chlorine, bromine or iodine, perhalogenates of the formula, XO$_4$, hexahalogenophosphates of the formula, PX$_6$, hexahalogenoarsenates of the formula, AsX$_6$, hexahalogenoantimonates of the formula, SbX$_6$, sulfate represented by SO$_4$, benzenesulfonate and 7,7,8,8-tetracyanoquinodimethane (hereinafter referred to simply as TCNQ) and its derivatives. The presence of these anions in the polymeric material results in high conductivity. These anions may be contained in the polymeric material singly or in combination. The content of anions depends on the reaction conditions, the type of five-membered heterocyclic compound, types of materials such as acceptors, and supporting electrolytes and the like used to prepare polymers of five-membered heterocyclic compounds. In general, the anions are contained in an amount of 0.01 to 0.3 mole per recurring unit.

Preparation of the polymeric materials according to the invention is described below.

Anion-doped polymeric materials can be prepared by electrochemically polymerizing a five-membered oxygen family heterocyclic compound in coexistence with an acceptor and a supporting electrolyte in a liquid phase whereby a polymeric material of the heterocyclic compound is obtained in the form of a film or sheet formed on a positive electrode while taking therein anions derived from either the acceptor or the supporting electrolyte.

The starting heterocyclic compound used, as defined before is, a member selected from the group consisting of furan, thiophene, selenophene and tellurophene which may have up to two substituents such as halogen, hydroxyl, amino and hydrocarbon group having up to 8 carbon atoms. Further, the starting heterocyclic compounds may be dimers, trimers or other oligomers of the above-mentioned compounds such as 2,2'-bithienyl, 2,2',5',2''-terthiophene and the like.

If the heterocyclic compound, supporting electrolyte and electron acceptor are all solid materials, suitable solvents for these materials are used. Typical examples of such solvents include nitriles such as acetonitrile. On the other hand, when at least one of the heterocyclic compound, supporting electrolyte and acceptor is a liquid, no solvent is necessary. Especially when the acceptor is liquid, this acceptor is effectively used as a solvent or dispersing medium for the reaction system. Examples of liquid acceptors include, for example, nitromethane, nitrobenzene, benzonitrile, dimethyl sulfate and diethyl sulfate. As a matter of course, gaseous materials such as arsenic pentafluoride may be used as an acceptor or supporting electrolyte by dissolution in a suitable solvent or directly blowing into a reaction system.

The supporting electrolytes are those compounds which are able to release anions such as of tetrahalogenoborates, $BX_4$, perhalogenates, $XO_4$, hexahalogenophosphates, hexahalogenophosphates, $PX_6$, hexahalogenoarsenates, $AsX_6$, hexahalogenoantimonates, $SbX_6$, sulfate, $SO_4$, benzenesulfonate and anion radicals of TCNQ and its derivatives. In the above formulas, all the Xs represent a halogen such as fluorine, chlorine, bromine or iodine. No specific limitation is placed on cations and particularly quaternary ammonium ions such as tetraethylammonium, tetra-n-butylammonium and the like, and alkali metals and alkaline earth metals are conveniently used.

The acceptors useful in the practice of the invention include, for example, nitro compounds such as nitromethane, nitrobenzene 2,4,7-trinitrofluorenone and the like, aromatic nitrile compounds such as benzonitrile, phthalodinitrile and the like, tetracyanoethylene, TCNQ or its derivatives such as 7,7,8,8-tetracyanoquinodimethane, 2,3,5,6-tetrafluoro-7,7,8,8-TCNQ and the like, tetracyanonaphthoquinodimethane derivatives such as 2,2,6,6-tetracyanonaphthoquinodimethane, 1,1,4,4-tetracyanonaphtoquinodimethane and the like, benzoquinone derivatives such as p-benzoquinone, p-fluoranil, p-chloranil, dicyanodichloroquinone, 1,3,6,8-tetracyanopyrene and the like, sulfuric acid, sulfonic acid such as benzenesulfonic acid, sulfates such as dimethyl sulfate, diethyl sulfate and and the like, sulfonates such as benzenesulfonate, boron trihalogenides such as boron trifluoride, aluminium trihalogenides such as aluminium trichloride, gallium trihalogenides such as gallium trichloride, arsenic pentahalogenides such as arsenic pentafluoride, antimony penthalogenides such as antimony pentafluoride, and the like. These acceptors may be used singly or in combination.

When the polymerization reaction is effected in coexistence with these acceptors, the resulting polymeric material becomes more dense, higher in mechanical strength and greater in conductivity than in the case where no acceptor is used. Presumably, this is because an acceptor serves to assist oxidation of a five-membered heterocyclic compound on a positive electrode thereby increasing the degree of polymerization of the heterocyclic compound.

The reason why nitromethane or dimethyl sulfate serves as an acceptor is considered as follows. These compounds are considered to polarize as shown in formulas (1) and (2) and act as an acceptor owing to the polarization of $\delta_+$.

(1)

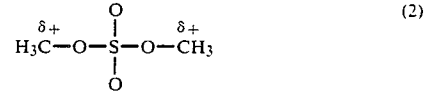

(2)

Especially when a five-membered heterocyclic compound which contains sulfur, selenium or tellurium therein is used, the resulting polymeric material obtained in the form of a film becomes very dense and tenacious. This is because sulfur, selenium or tellurium has such low electro-negativity that an acceptor can effectively act on a heterocyclic compound containing sulfur, selenium or tellurium.

The anions taken in the polymeric material according to the invention are generally derived from a supporting electrolyte but may be derived from an acceptor which also serves as a supporting electrolyte. Examples of such acceptors include sulfuric acid, benzenesulfonic acid, TCNQ or its derivatives, boron trifluoride, arsenic pentafluoride and antimony petafluoride. Especially when sulfuric acid, benzenesulfonic acid or TCNQ or its derivatives are used, no supporting electrolytes are necessary in order to give anion-doped polymeric materials of five-membered oxygen family heterocyclic compounds in which anions are taken. Moreover, when an acceptor which is liquid at reaction temperatures is used, no solvent is necessary. Examples of the liquid acceptors include nitromethane, nitrobenzene, benzonitrile, sulfuric acid, alkyl sulfates such as dimethyl sulfate, diethyl sulfate and the like. When sulfuric acid is used, it may be possible, though not favorable, to effect the reaction without use of solvents or supporting electrolytes. As mentioned hereinbefore, anions are not necessarily contained stoichiometrically in the polymeric materials of the invention. For instance, a polymeric material obtained from thiophene and a TCNQ acceptor has the empirical formula, $C_{4.5}H_{2.6}N_{0.059}S$.

This reveals that the polymeric material is a polymeric charge transfer complex which has linear thienylene groups and 1 to 2 TCNQ molecules in about 100 thienylene groups. That is, TCNQ derivatives are so large in electron acceptability that they readily form a charge transfer complex with a coexisting heterocyclic compound. This charge transfer complex is considered to serve as a supporting electrolyte during the electrochemical polymerization reaction.

The polymerization reaction is generally effected under conditions of a current density of 0.1 to 20 mA/cm$^2$, preferably 1 to 5 mA/cm$^2$. The solvents applied may vary depending on the distance between plates and is usually in the range of 1 to 100 V, preferably 2 to 20 V. The distance between plates is generally in the range of 1 mm to several centimeters, preferably several millimeters to several centimeters. The reaction time varies depending on the type of starting material, the current density, the voltage and other reaction conditions and is generally in the range of 1 minute to 10 hours, preferably 5 minutes to 1 hour. Longer times result in a thicker film. Films of thicknesses larger than 1000 microns are unfavorable because they tend to become porous or bulky.

In the practice of the invention, a polymeric material is formed by the electrochemical polymerization on a positive electrode in the form of a film. The polymerization is controlled so to produce a thickness of film ranging from 0.1 to 1000 microns. The positive electrode is made of platinum, gold, tin-doped indium oxide glass or Nesa glass though other ordinarily employed semiconductive oxide materials may also be used. When tin-doped indium glass or Nesa glass is used, a film formed on the glass can readily be removed therefrom. On the other hand, a film formed on platinum or gold is firmly adhered thereto. Accordingly, these electrode materials are preferably used depending on the purpose of the film.

The polymerization reaction is usually effected at a normal temperature but temperature lower than 15° C. are preferably used. Most preferably, temperatures lower than 10° C. are used. A lower temperature limit is the melting point of a liquid used in the reaction system. The reason why temperatures lower than 15° C. are preferable is that films obtained under low temperature conditions are improved in mechanical strength and conductivity over films obtained at normal temperatures. In this connection, however, too low a temperature, say, below 5° C. is not advantageous because no further improvement can be expected. In order to cause the reaction to proceed smoothly, a solution or dispersion of a starting heterocyclic compound is so controlled as to have a concentration of 0.001 to 10 moles/liter, preferably 0.1 to 1 mole per liter. Lower concentrations will impede formation of the layer of polymeric material on the positive electrode. Higher concentrations may undesirably cause the reaction to proceed in a manner that produces a non-homogeneous product.

In general, the amount of anions taken in the polymeric materials is determined by choice of reaction conditions discussed above and the types of starting materials, acceptors and supporting electrolytes. According to the method of the invention, anions are incorporated in the polymeric materials in an amount of 0.01 to 0.3 mole per recurring unit of a polymer chain, within which an intended level of conductivity is ensured.

Typical examples of polymeric materials according to the invention are summarized in the following Table 1 in which there are shown empirical formulas based on the results of elementary analysis and conductivities of these materials determined by the four probe technique. In the four probe test, two films of each polymeric material having a width of 15 mm and a length of 110 mm are applied with a silver paint and dried for use in measurement of its conductivity. In the table, each conductivity is an average value of two samples.

TABLE 1

| Polymeric Material No. | Empirical Formula | Conductivity ohm$^{-1}$ cm$^{-1}$ |
|---|---|---|
| 1 | $C_{4.0}H_{2.0}S_{0.98}(BF_4)_{0.045}$ | 6.4 |
| 2 | $C_{4.0}H_{1.9}S_{0.93}Cl_{0.13}$ | $1.7 \times 10$ |
| 3 | $C_{4.0}H_{1.9}S_{1.1}$ | $7.3 \times 10^{-2}$ |
| 4 | $C_{4.5}H_{2.6}N_{0.059}S$ | $4.3 \times 10^{-1}$ |
| 5 | $C_{4.0}H_{2.4}S_{0.77}(AsF_6)_{0.082}$ | $1.2 \times 10$ |
| 6 | $C_{4.0}H_{2.1}Se_{0.91}Cl_{0.064}$ | $1.3 \times 10^2$ |
| 7 | $C_{4.0}H_{2.2}Te_{0.88}Cl_{0.093}$ | $6.4 \times 10$ |
| 8 | $C_{4.0}H_{2.2}S_{0.92}(PF_6)_{0.055}$ | 2.4 |
| 9 | $C_{4.0}H_{2.3}S_{0.95}(SbF_6)_{0.047}$ | 9.8 |

Infrared absorption spectra of Nos. 1 through 4 are shown in FIGS. 1 through 4, respectively. Relatively flat spectra will give evidence that carriers in the polymeric materials are likely to freely move.

Figure 5:
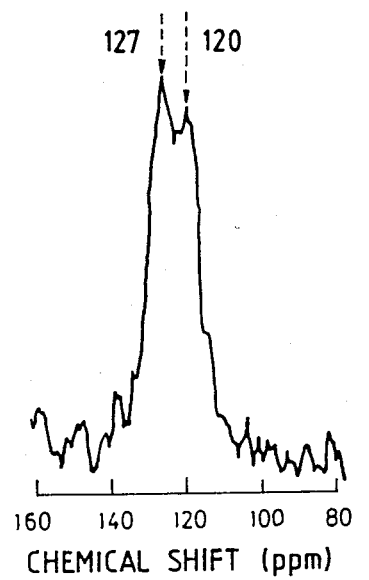
FIG. 5 is a CP/MAS spectrum of a polymeric material according to the invention.

In Table 1, for example, the empirical formula of the polymer material No. 1 reveals that the main chain of the polymeric material consists of thiophene rings joining with one another and tetrafluoroborate ions are sporadically present. The existence of the main chain is supported by the CP/MAS spectrum of polymeric material No. 2 shown in FIG. 5. As is seen from FIG. 5, two peaks of carbon atoms appear at 120 and 127 ppm, respectively, within a range of 0 to 400 ppm. In view of the chemical shifts these carbon atoms have aromaticity and are thus considered to be carbon atoms at alpha and beta positions of the thiophene ring. It will be noted that a reference compound for the CP/MAS spectrum is tetramethylsilane.

Figure 6:
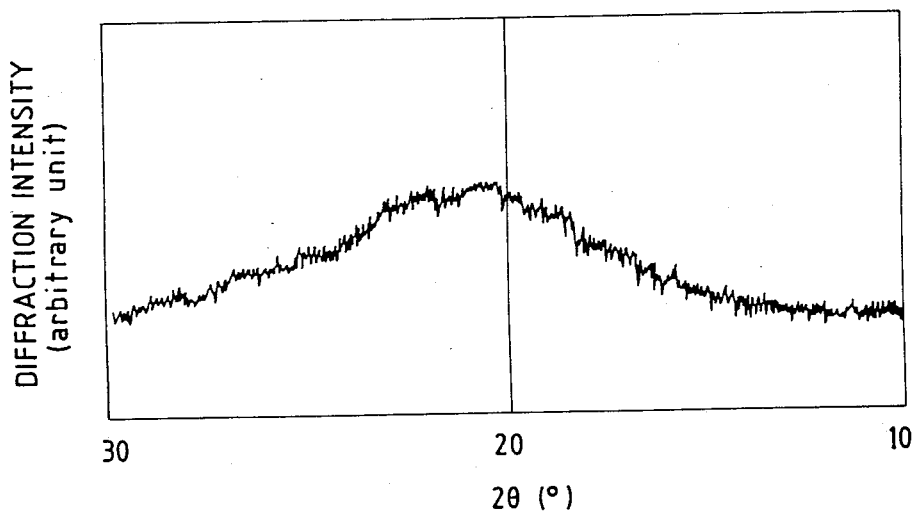
FIG. 6 is an X-ray diffraction pattern of the polymeric material used with respect to FIG. 5.

In FIG. 6, there is shown an X-ray diffraction pattern of polymeric material No.1, from which the polymeric material has an amorphous structure. This tendency is not limited to this polymeric material but other polymeric materials have similar X-ray diffraction patterns.

The present invention is more particularly described by way of examples.

EXAMPLE 1

Four grams of thiophene and different supporting electrolytes capable of releasing anions each in an amount of 1/10 equivalent of the thiophene were dissolved in a liquid acceptor which was also used as a solvent. The resulting solutions were each subjected to electrochemical polymerization at a current density of 2 mA/cm$^2$ for 20 minutes thereby forming a polymer film on a positive electrode which was made of a glass electrode deposited with tin-doped indium oxide in the form of a thin film. The film was washed with methanol and dried over day and night. As a result, the polymeric material Nos. 1 through 3 indicated in table 1 were obtained. In Table 2, there are shown supporting electrolytes and acceptors used in this example. It will be noted that all the acceptors used are liquid and also serve as a solvent.

TABLE 2

| Polymeric Material No. | Supporting Electrolyte | Acceptor |
|---|---|---|
| 1 | tetra-n-butylammonium fluoroborate | nitrobenzene |
| 2 | tetra-n-butylammonium perchlorate | nitrobenzene |
| 3 | sulfuric acid | diethyl sulfate |

EXAMPLE 2

0.05 mole of each of selenophene and tellurophene and 0.01 mole of each of tetra-n-butylammonium fluoroborate and tetra-n-butylammonium perchlorate were separately dissolved in 200 ml of nitrobenzene, followed by repeating the procedure of Example 1 to obtain films of polymeric materials. These films were subjected to measurement of conductivity by the four probe technique with the result that a conductivity was over 10/ohm.cm in all the cases.

EXAMPLE 3

0.05 mole of each of 3-chlorothiophene, 3-bromothiophene, 3-iodothiphene, 3-hydroxythiophene, 3-aminothiophene, 3-methylthiophene and 3-ethylthiophene and 0.01 mole of tetra-n-butylammonium fluoroborate were separately dissolved in 200 ml of nitrobenzene, followed by repeating the procedure of Example 1. The resulting films had a conductivity over about $10^{-2}$/ohm.cm for all the starting materials except 3-methylthiophene. The film obtained from 3-methylthiophene was found to have a conductivity as high as over $10^2$/ohm.cm.

EXAMPLE 4

1 g of thiophene and 0.1 g of TCNQ were dispersed in 100 ml of dimethyl sulfate, which was energized at a current density of 1 mA/cm² for 30 minutes to form a film of a conductive polymeric material on a positive glass electrode depositing thereon a thin film of indium oxide. The polymer film was washed with methanol and dried in vacuo over day and night to obtain polymeric material No. 4 of Table 1.

EXAMPLE 5

1 g of each of five-membered heterocyclic compounds and each of supporting electrolytes in different amounts indicated in Table 3 below were dissolved in an acceptor serving as a solvent indicated in Table 3. The resulting solutions were treated in a manner similar to the foregoing examples but an electric current was passed for 20 minutes at different current densities indicated in Table 3 thereby forming films of polymeric materials on a platinum positive electrode. Each film was washed with methanol and dried in vacuo over day and night to obtain polymeric material Nos. 5 through 9.

TABLE 3

| Polymeric Material No. | Five-membered Heterocyclic Compound | Supporting Electrolyte (charge, anode current density) | Acceptor (Solvent) |
|---|---|---|---|
| 5 | thiophene | tetra-n-butylammonium hexafluoroarsenate (0.1 g, 2 mA/cm²) | dimethyl sulfate |
| 6 | selenophene | tetraethylammonium perchlorate (0.2 g, 10 mA/cm²) | benzonitrile |

TABLE 3-continued

| Polymeric Material No. | Five-membered Heterocyclic Compound | Supporting Electrolyte (charge, anode current density) | Acceptor (Solvent) |
|---|---|---|---|
| 7 | tellurophene | tetra-n-butylammonium perchlorate (0.5 g, 10 mA/cm²) | nitrobenzene |
| 8 | thiophene | tetra-n-butylammonium hexafluorophosphate (0.1 g, 2 mA/cm²) | dimethyl sulfate |
| 9 | thiophene | tetra-n-butylammonium hexafluoroantimonate (0.1 g, 2 mA/cm²) | dimethyl sulfate |

EXAMPLE 6

1 g of thiophene or its derivative, 0.1 g of an acceptor and a supporting electrolyte indicated in Table 4 were dissolved in 100 ml of acetonitrile, followed by electrochemical polymerization under conditions of 5 mA/cm² and 10 minutes thereby forming a film of a conductive polymeric material on a positive platinum electrode. The film was washed with methanol and dried in vacuo over day and night.

The starting materials are summarized in Table 4 along with conductivity of the obtained materials.

TABLE 4

| Polymeric Material No. | Five-membered Heterocyclic Compound | Supporting Electrolyte | Acceptor | Conductivity. $(ohm \cdot cm)^{-1}$ |
|---|---|---|---|---|
| 10 | thiophene | tetra-n-butylammonium fluoroborate (0.1 g) | TCNQ | 2.7 |
| 11 | thiophene | tetra-n-butylammonium fluoroborate (0.1 g) | phthalonitrile | $5.5 \times 10^{-1}$ |
| 12 | 3-methylthiophene | tetraethylammonium perchlorate (0.2 g) | p-benzoquinone | $1.1 \times 10$ |

Two films each having a width of 14 mm and a length of 110 cm were cut off from each of the anion-doped polymeric materials of Nos. 1 through 12 and were used for testing their folding endurance according to the procedure prescribed in JIS P8115-1960. As a result, it was found that all the films could stand the folding endurance over 50 times.

For comparison, 1 g of pyrrole and 0.1 g of tetra-n-butylammonium fluoroborate were dissolved in 100 ml of acetonitrile, followed by electrochemically polymerizing under conditions of 20 V, 5 mA/cm² and 10 minutes. The resulting film of a polymeric material could stand the folding endurance only below 10 times.

What is claimed is:

1. A conductive or semiconductive polymeric material consisting essentially of a polymer having recurring units of a five-membered oxygen family heterocyclic ring selected from the group consisting of unsubstituted furan, thiophene, selenophene and tellurophene rings, and furan, thiophene, selephene and tellurophene rings which may be substituted by one or two substituents selected from the group consisting of halogen, hydroxyl, amino and a hydrocarbon group of up to 8 carbon atoms, and anions doped in said polymer and selected from the group consisting of anion radicals of tetrahalogenoborates, perhalogenates, hexahalogenophosphates, hexahalogenoarsenates, hexahalogenoantimonates, sulfate, benzenesulfonate, tetracyanoquinodimethane and derivatives thereof, and mixtures thereof, whereby said polymeric material becomes electrically conductive or semiconductive, there being sufficient anions doped in said polymer to provide improved conductivity of said polymer.

2. A polymeric material according to claim 1, wherein said five-membered oxygen family heterocyclic ring is an unsubstituted or substituted thiophene ring.

3. A polymeric material according to claim 2, wherein the substituted thiophene ring is methylthiophene.

4. A polymeric material according to claim 1, wherein said five-membered oxygen family heterocyclic ring is an unsubstituted or substituted selenophene ring.

5. A polymeric material according to claim 1, wherein said five-membered oxygen family heterocyclic ring is an unsubstituted or substituted tellurophene.

6. A polymeric material according to claims 1, 2, 4 or 5 wherein said five-membered oxygen family heterocyclic ring has up to two substituents each selected from the group consisting of a halogen, a hydroxyl group, an amino group and a hydrocarbon group having up to 8 carbon atoms.

7. A polymeric material according to claim 1, wherein said polymeric material is in the form of a dense, tenacious film.

8. A polymeric material according to claim 1 wherein the amount of anions present in the polymer is in the range of 0.01 to 0.3 mole per recurring unit.

* * * * *